United States Patent
Lindgren et al.

(10) Patent No.: US 8,655,082 B1
(45) Date of Patent: Feb. 18, 2014

(54) ENGINEERING AND TOOLING DRAWING COMPARISON, DISPOSITION STATUS AND ANALYSIS

(75) Inventors: Lawrence S. Lindgren, Redmond, WA (US); David B. Shema, Seattle, WA (US)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 12/952,165

(22) Filed: Nov. 22, 2010

(51) Int. Cl.
*G06K 9/68* (2006.01)

(52) U.S. Cl.
USPC .......................................... 382/218

(58) Field of Classification Search
None
See application file for complete search history.

(56) References Cited

U.S. PATENT DOCUMENTS

2006/0242619 A1* 10/2006 Pang et al. ....................... 716/19
2009/0180680 A1* 7/2009 Satou et al. .................... 382/144

OTHER PUBLICATIONS

Benavides, Ricardo. "Digital Data Products and Services for Commercial Airplanes." Boeing, Jun. 6, 2009. Web. May 29, 2013.*

* cited by examiner

*Primary Examiner* — Nirav G Patel
(74) *Attorney, Agent, or Firm* — Ameh IP; Lowell Campbell; Elahe Toosi

(57) ABSTRACT

A system and method for an automatic drawing comparison are disclosed. A batch capture processing module captures a plurality of pairs of drawing picture frames, and a drawing normalization module normalizes the pairs of drawing picture frames of the plurality to establish pairs of normalized drawing picture frames. A drawing comparison module compares each drawing picture frame of each of the respective pairs to generate respective drawing comparisons thereof, and a statistical data generator module communicates a statistical report identifying which of the respective drawing comparisons are recommended and not recommended for review.

20 Claims, 3 Drawing Sheets

|  | DRAWING 1 | | DRAWING 2 | | |
| --- | --- | --- | --- | --- | --- |
|  | BLK PIXELS 306 | CHANGED PIXELS 308 | % CHANGED 310 | BLK PIXELS 312 | CHANGED PIXELS 314 | % CHANGED 316 |
| CASE 1 | | | | | | |
| COMPARISON 1 | 305,062 | 34,846 | 11.42% | 295,346 | 23,759 | 8.04% |
| COMPARISON 2 | 249,017 | 4,873 | 1.96% | 249,358 | 5,219 | 2.09% |
| COMPARISON 3 | 185,926 | 13,515 | 7.27% | 175,642 | 3,434 | 1.96% |
| CASE 2 | | | | | | |
| COMPARISON 1 | 303,619 | 260,035 | 85.65% | 306,080 | 261,558 | 85.45% |
| COMPARISON 2 | 236,047 | 219,191 | 92.86% | 233,190 | 216,357 | 92.78% |
| COMPARISON 3 | 220,203 | 194,130 | 88.16% | 208,944 | 181,001 | 86.63% |

*FIG. 3*

ENGINEERING AND TOOLING DRAWING COMPARISON, DISPOSITION STATUS AND ANALYSIS

FIELD

Embodiments of the present disclosure relate generally to computer graphics. More particularly, embodiments of the present disclosure relate to drawing comparison systems.

BACKGROUND

Making modifications to an existing system such as an existing aircraft generally requires examinations and modification of legacy design drawings. For example, the B-52 aircraft is expected to have an operating life in excess of 80 years, where original legacy drawings for the B-52 aircraft may be scanned hand drawings. More commonly, existing passenger aircraft designs may be converted to freight operations. A maintenance engineering engineer, mods engineer, or freighter conversions engineer may need to compare two different versions of drawings stored in a database, and document results of their findings for future use. The drawings are often very complex and therefore, it can be very time-consuming to discover and locate a change that has been made.

Currently, users spend a considerable amount of time performing a visual inspection of two sets of drawing pictures either via printouts of the drawings or by displaying both drawings on a monitor and switching back and forth until they find all the differences. It can be quite easy to miss some changes in a very complex drawing. In freighter conversions, engineers may try to capture their conclusions in spreadsheet form, but often the spreadsheet information is delayed because of work pressures, and therefore the spreadsheet information can be easily misplaced or not updated in a timely manner.

SUMMARY

A method and system for drawing comparison is disclosed. Differences between old drawings and related current drawing revisions are determined, and related decisions are captured. For each pair of drawing picture frames, an additional drawing picture frame is created that displays a difference between the two; however, unlike existing approaches an entire set of drawings are submitted in a batch process, typically by tens, hundreds or thousands. Furthermore, a statistical report is communicated identifying which of the respective drawing comparisons are recommended and not recommended for review. In this manner, considerable time for dispositioning data may be saved, and accurate real-time status of the disposition process is provided, enabling optimization of an overall design effort.

In a first embodiment, an automated drawing comparison system comprises a batch capture processing module operable to capture a plurality of pairs of drawing picture frames. The automated drawing comparison system further comprises a drawing normalization module operable to normalize the pairs of drawing picture frames of the plurality to establish pairs of normalized drawing picture frames. The automated drawing comparison system further comprises a drawing comparison module operable to compare each drawing picture frame of each of the respective pairs to generate respective drawing comparisons thereof. The automated drawing comparison system also comprises a statistical data generator module operable to communicate a statistical report identifying which of the respective drawing comparisons are recommended and not recommended for review.

In a second embodiment, a method of an automatic drawing comparison captures a batch of a plurality of pairs of drawing picture frames, and normalizes the pairs of drawing picture frames of the plurality to establish respective pairs of normalized drawing picture frames. The method also compares each of the respective pairs of normalized drawing picture frames to generate respective drawing comparisons thereof. The method also communicates a statistical report identifying which of the drawing comparisons are recommended and not recommended for review.

In a third embodiment, a computer readable storage medium comprises computer-executable instructions for performing a method for an automatic drawing comparison. The method executed by the compute-executable instructions captures a batch of a plurality of pairs of drawing picture frames, and normalizes the pairs of drawing picture frames of the plurality to establish respective pairs of normalized drawing picture frames. The method executed by the compute-executable instructions also compares each of the respective pairs of normalized drawing picture frames to generate respective drawing thereof. The method executed by the compute-executable instructions also communicates a statistical report identifying which of the drawing comparisons are recommended and not recommended for review.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 3 is an illustration of a table showing an exemplary statistical report of drawing comparison according to an embodiment of the disclosure.

DETAILED DESCRIPTION

Figure 1:
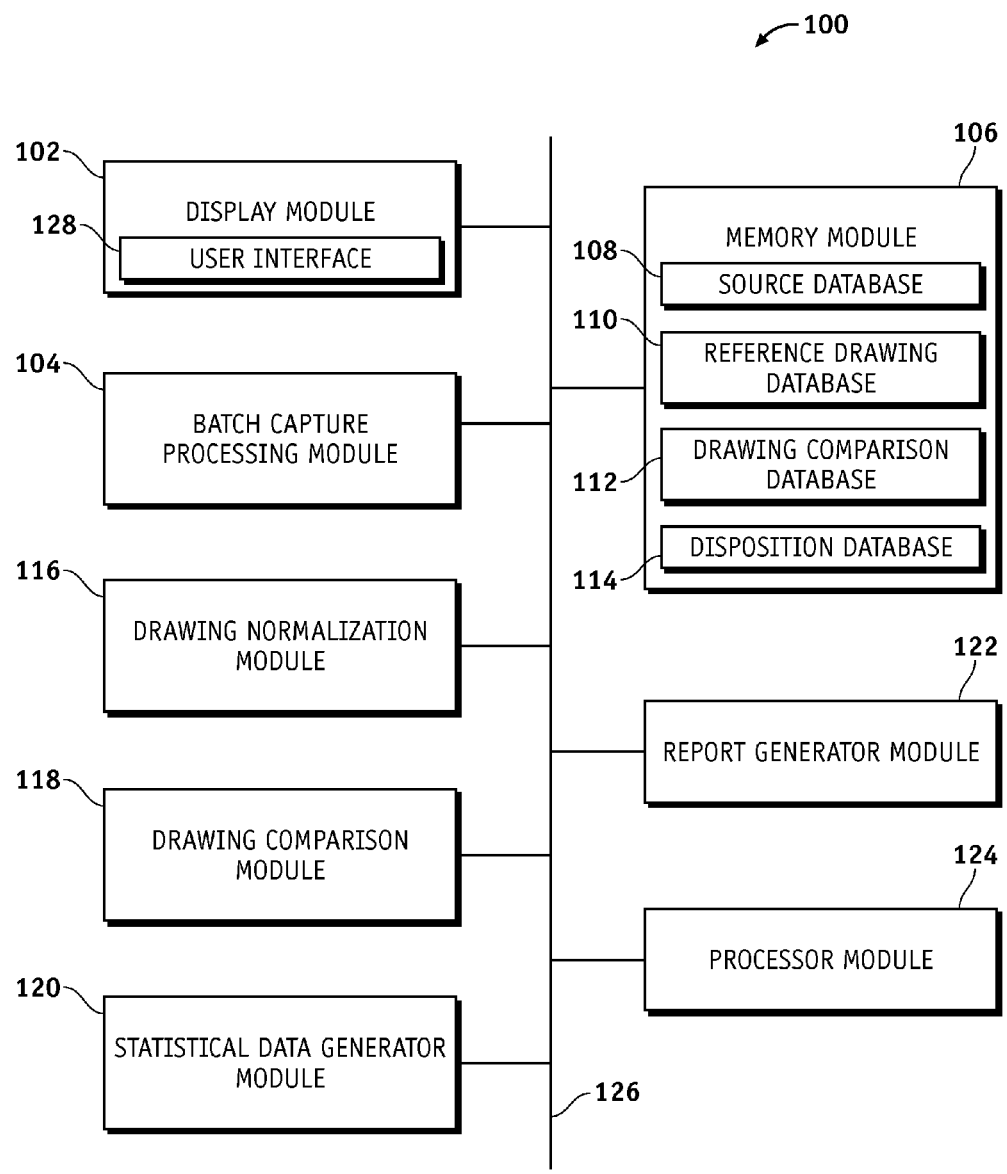
FIG. 1 is an illustration of an exemplary functional block diagram of an automated drawing comparison system according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to production of images such as drawing images, data acquisition, data storage, computation, and other functional aspects of the systems (and the individual operating components of the systems) may not be described in detail herein. In addition, those skilled in the art will appreciate that embodiments of the present disclosure may be practiced in conjunction with a variety of computational machines, and that the embodiments described herein are merely example embodiments of the disclosure.

Embodiments of the disclosure are described herein in the context of a practical non-limiting application, namely, comparing drawn images. Embodiments of the disclosure, however, are not limited to such drawing application, and the techniques described herein may also be utilized in other image building applications. For example but without limitation, embodiments may be applicable to photos, moving pictures, finger prints, X-rays, maps, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Currently, users spend a considerable amount of time performing a visual inspection of two sets of drawing pictures either from printouts of the drawings or by displaying both drawings on their computer monitor and switching back and forth until they find substantially all the differences. It may be quite easy to miss some changes in a very complex drawing. In freighter conversions, the engineers try to capture their conclusions in spreadsheet form, but often the information is delayed because of work pressures and therefore it can easily be lost or not updated in a timely manner.

Disclosed is a process for visualizing differences between old engineering designs (drawings/images) to related current revisions, and capturing related engineering decisions. However, as mentioned above, the process can also be applied to visualizing differences between other old images/drawings and their current revisions. The other images and/or drawings may comprise, for example but without limitation, photos, moving pictures, finger prints, X-rays, maps, and the like. Drawings and images may be used interchangeably herein.

For each pair of drawing frames, an additional picture frame is created that displays a difference between an old engineering design and a related current revision; however, unlike existing methods an entire set of drawings is submitted in a batch process (i.e., typically tens, hundreds or thousands of comparisons are required). Furthermore, a statistical report is produced that indicates which comparisons may be useful to view and which may not be useful.

FIG. 1 is an illustration of an exemplary functional block diagram of an automated drawing comparison system 100 according to an embodiment of the disclosure. The system 100 may comprise, for example but without limitation, a desktop, a laptop computer, a notebook computer, a handheld computing device (PDA, cell phone, palmtop, etc.), a mainframe, a server, a client, or any other type of special or general purpose computing device as may be desirable or appropriate for a given application or environment. The system 100 may generally comprise, a display module 102, a batch capture processing module 104, a memory module 106 comprising: a source database 108, a reference drawing database 110, a drawing comparison database 112, and a disposition database 114, a drawing normalization module 116, a drawing comparison module 118, a statistical data generator module 120, a report generator module 122, and a processor module 124.

A practical system 100 may comprise any number of input modules, any number of processor modules, any number of memory modules comprising any number of databases, any number of display modules, any number of batch capture processing modules, and any number of other modules mentioned above. The illustrated system 100 depicts a simple embodiment for ease of description. These and other elements of the system 100 are interconnected together, allowing communication between the various elements of system 100. In one embodiment, these and other elements of the system 100 may be interconnected together via a communication link 126. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

System 100 compares drawings and generates comparison and disposition reports and databases using a batch capture process. Resulting databases make it easier for a user to recognize what has changed, and to capture a disposition of a drawing made by the user as an aid for future users. The disposition may comprise, for example but without limitation, a recommended action, and the like. System 100 visualizes differences between old (engineering) designs relative to related current revisions, and captures (engineering) decisions based on the differences. For each pair of drawing frames, an additional picture frame is created that displays the differences; however, unlike existing arts, the system 100 submits an entire set of drawings in a batch process (typically tens, hundreds or thousands of comparisons are required). A statistical report is communicated, identifying which of the drawing comparisons are recommended and not recommended for review, thereby saving considerable time.

The display module 102 is configured to display input and output parameters of the system 100. The display module 102 displays, for example but without limitation, old drawings, new drawings, differences between the old drawings and the new drawings, notes, a disposition chosen for each drawing comparison, and the like. The display module 102 comprises a user interface 128 operable to allow the user to record their disposition of each comparison and store that disposition in the disposition database 114. The display module 102 accepts an operation command, and outputs operation command information to the processor module 124 in response to the operation command. The display module 102 may be formed by, for example but without limitation, an organic electroluminescence (OEL) panel, liquid crystal panel (LCD), and the like. Various kinds of information can be displayed on the display module 102 via an image/video signal supplied from the processor module 124.

The batch capture processing module 104 captures a series of pairs of drawings comprising original drawings and their reference counterparts to the drawing comparison module 118 without manual intervention. In this manner, drawing comparisons may be done as a single batch process of tens, hundreds or thousands of drawing picture frames comparisons in a single step, requiring no user interaction for each comparison. Batch jobs are set up so they can be run to completion without manual intervention, so all input data is preselected through scripts or command-line parameters.

This is in contrast to "online" or interactive programs which prompt a user for such input. The batch processing module 104 takes a set of data files such as drawings as input, processes the drawings, and produces a set of output data files comprising differences between at least two drawings. This operating environment is termed as "batch processing" because the input data are collected into batches on files and are processed in batches by the program. The batch capture processing module 104 uses, for example but without limitation, the source database 108, the reference drawing database 110, and the like, as input, and produces a set of output data, such as but without limitation, the drawing comparison database 112, and the like.

The memory module 106 may be any suitable data storage area with suitable amount of memory that is formatted to support the operation of the system 100. Memory module 106 is configured to store, maintain, and provide data as needed to support the functionality of the system 100 in the manner described below. In practical embodiments, the memory module 106 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory module 106 may be coupled to the processor module 124 and configured to store, for example but without limitation, the source database 108, the reference drawing database 110, the drawing comparison database 112, the disposition database 114, and the like.

Additionally, memory module 106 may represent a dynamically updating database comprising a table for purpose of computing using the processor module 124. The memory module 106 may also store, a computer program such as a batch capture processing program/script that is executed by the batch capture processing module 104, an operating system, an application program, tentative data used in executing a program processing, and the like. The memory module 106 may be coupled to the processor module 124 such that the processor module 124 can read information from and write information to the memory module 106. As an example, the processor module 124 and the memory module 106 may reside in their respective ASICs. The memory module 106 may also be integrated into the processor module 124. In an embodiment, the memory module 106 may comprise a cache memory for storing temporary variables or other intermediate information during execution.

The source database 108 comprises original drawings database such as, for example but without limitation, a Reference Engineering Data Automated Retrieval System (REDARS) database, other image databases, and the like. The REDARS database may be used by, for example but without limitation, a technical document management system to store a vast number of technical documents, and the like. The REDARS database comprises, for example but without limitation, engineering and tooling drawings for airplanes, an authoritative company-wide source of engineering drawings and parts information, and the like. A selection of drawing structure links may be used to search for data in a category. Drawings are typically captured as scanned images (e.g., Tagged Image File Format (TIFF) files). Therefore, the objects depicted may not be stored as lines, curves, text, but rather as pixels such as a typical digital image may be stored.

The reference drawing database 110 comprises a list of drawing references typically obtained by a user for which comparisons are required. For example, for freighter conversions, the list may comprise an entire set of drawings to be reviewed for a passenger-to-freighter conversion, perhaps several thousand drawings in total. For another example, the list may comprise an entire set of X-ray images to be reviewed for medical research, perhaps several thousand X-rays in total.

The drawing comparison database 112 stores results of comparison of the drawings. The drawing comparison database 112 may comprise for example but without limitation, a subset of drawings retrieved from the source database 108 such as the REDARS database, a normalized set of drawings that is modified in order to facilitate a drawing comparison as explained below, a newly created set of compared drawings, a reference indicator that tells the engineer/user whether each comparison is likely to be helpful, and the like. The drawing comparison database 112 captures both the drawing comparisons and links back to original drawings in the source database 108 such as the REDARS database. The entire set of comparisons is captured and organized to represent, for example but without limitation, an entire design effort (i.e., such as a major modification for a specific aircraft), and the like.

The disposition database 114 captures references to the compared drawing and the resulting comparison, the user notes, as well as the disposition chosen for each comparison, organized within a structure led by the high-level task being performed, such as but without limitation, a specific aircraft identifier being converted from a passenger to a freighter, and the like. The disposition database 114 is used for managing the disposition process, plus providing the user with various results summaries. In this manner, the system 100 provides the user with a complete set of drawings to be compared. The set of drawing may be organized in such a way that users can readily find logical subsets, perhaps using a work breakdown structure, such as but without limitation, an airplane work breakdown structure, a building work breakdown structure, and the like, and links to original picture frames plus related comparison picture frame, for analysis and disposition.

The disposition database 114 may vary according to each organization (i.e., design, research, maintenance, etc.), but may comprise, for example but without limitation, a field to capture users notes relevant to the disposition, a flag indicating that no further work is required, a flag indicating that detailed work will be required, and the like. For example, for maintenance engineering, the logical subsets may be those reflecting a name of relevant documents and chapters that need to be revised.

The drawing normalization module 116 automatically preprocesses or normalizes the drawing picture frames. In this manner, potential problems that may be encountered when comparing drawing pictures frames can automatically be identified. The batch capture processing module 104 submits a series of pairs of drawing picture frames and their reference counterparts to the drawing normalization module 116. Each pair of drawing picture frames are then compared and re-aligned to adjust them for, for example but without limitation, deviations in rotation, scale factor, mirror images, translations, and the like. If proper alignment cannot be completed, each pair of the drawing picture frames is flagged so that the user can perform a drawing comparison individually for this pair of the drawing picture frames, if desired. In one embodiment, several picture frames may be combined into one picture before or after performing one or more of these re-alignment transformations, prior to the comparison.

The drawing comparison module 118 compares normalized drawing picture frames, creates an additional picture frame for the pair of drawing picture frames, generates differences between a pair of drawing picture frames, and displays the differences between the pair of drawing picture frames on the additional picture frame. A pixel-by-pixel comparison is performed between each pair of frames. Each unique pixel is highlighted to provide a visually different presentation from those pixels that exist in both drawing pictures.

In digital imaging, a pixel is a single point in a raster image. The pixel is a smallest addressable screen element; it is a smallest unit of a picture that can be controlled. Each pixel has its own address. The address of a pixel corresponds to its coordinates. Pixels are normally arranged in a two-dimensional grid, and are often represented using dots or squares. Each pixel is a sample of an original image; more samples typically provide more accurate representations of the original. The intensity of each pixel is variable. In color image systems, a color is typically represented by three or four component intensities such as red, green, and blue, or cyan, magenta, yellow, and black. The drawing comparison module 118 provides comparison between portions or whole of each of the pairs of normalized drawing picture frames as explained in more detail below.

The statistical data generator module 120 communicates a statistical report identifying which of the respective drawings comparisons are recommended and not recommended for review. The statistical report is explained in more detail in the context of discussion of FIGS. 2-3 below.

The report generator module 122 generates a drawing comparison and disposition report comprising various reports of the disposition status, progress, and results. In this manner, the report generator module 122 retrieves data from the disposition database 114 and the statistical report to provide detailed information on the various dispositions of any pair of drawing picture frames, or subset of drawings or for an entire work statement, such as but without limitation, the conversion of a specific aircraft from passenger to freighter, conversion of a specific vehicle from passenger to cargo, and the like. Reports may also be provided for management purposes, comprising, for example but without limitation, a number/percentage of drawing comparisons completed, versus those remaining, for the entire work statement, or for any subset thereof, names of individuals to whom the dispositions are assigned, and the like. In this manner, management can shift effort as needed, in order to complete the disposition process more rapidly.

The processor module 124 is configured to support functions of the system 100. The processor module 124 may control operations of the system 100 so that processes of the system 100 are suitably performed. For example, the processor module 124 controls operations of the system 100 to access the source database 108, the reference drawing database 110, the drawing comparison database 112, and the disposition database 114. The processor module 124 uses the batch capture processing module 104 to cause the drawing comparison module 118 to automatically produce comparisons for a large number of pairs of drawing picture frames. The processor module 124 also controls the display module 102 to cause the display module 102 to display drawing comparison and disposition report, and the like.

The processor module 124, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

In practice, the processor module 124 comprises processing logic that is configured to carry out the functions, techniques, and processing tasks associated with the operation of system 100. In particular, the processing logic is configured to support operation of the system 100 to compare pairs of drawings in batch and produce drawing comparison and disposition report enabling users to easily find the changes between drawing versions.

Figure 2:
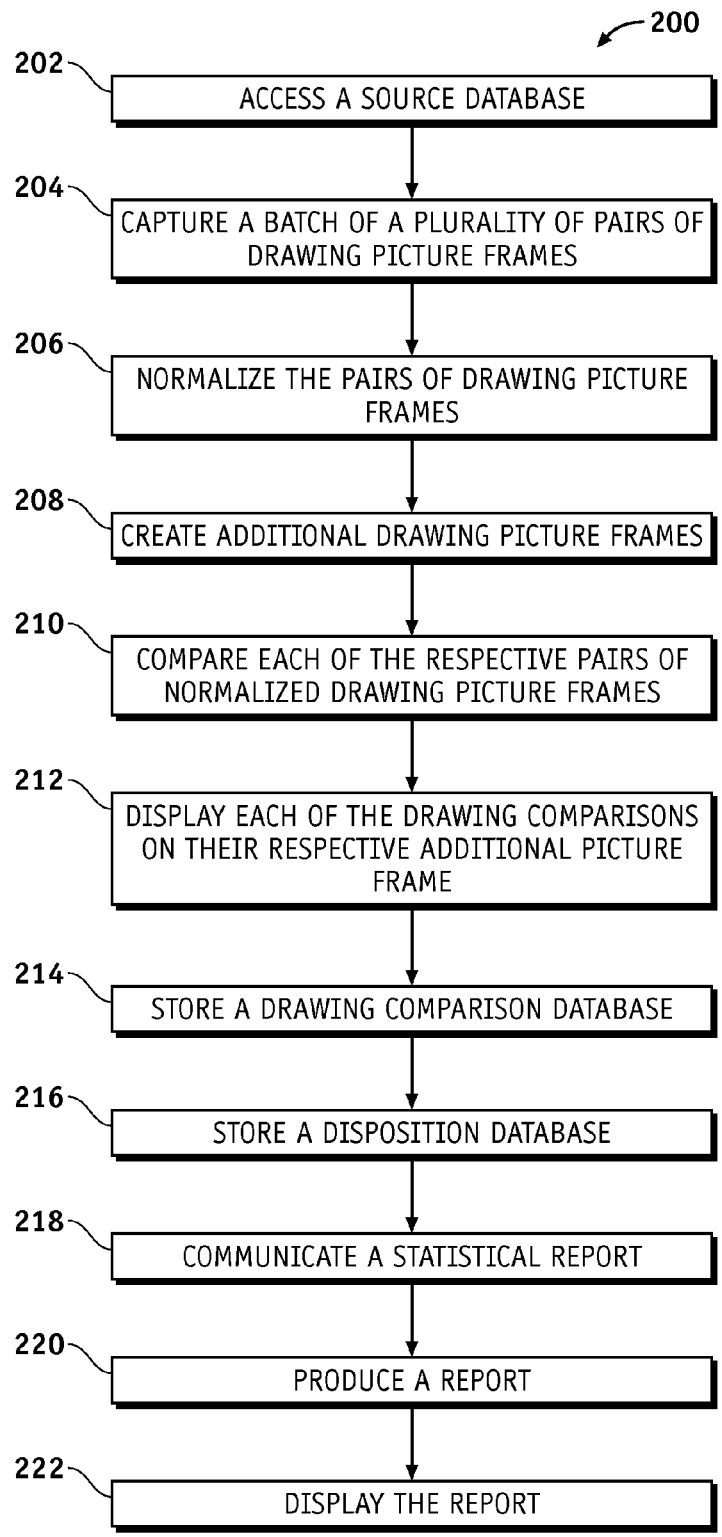
FIG. 2 is an illustration of an exemplary flowchart showing an automated drawing comparison process according to an embodiment of the disclosure.

FIG. 2 is an illustration of an exemplary flowchart showing a drawing comparison process 200 according to an embodiment of the disclosure. The various tasks performed in connection with process 200 may be performed, by software, hardware, firmware, a computer-readable medium having computer executable instructions for performing the process method, or any combination thereof. The process 200 may be recorded in a computer-readable medium such as a semiconductor memory, a magnetic disk, an optical disk, and the like, and can be accessed and executed, for example, by a computer CPU such as the processor module 124 in which the computer-readable medium is stored. It should be appreciated that process 200 may include any number of additional or alternative tasks, the tasks shown in FIG. 2 need not be performed in the illustrated order, and the process 200 may be incorporated into a more comprehensive procedure or process having additional functionality not described in detail herein.

For illustrative purposes, the following description of the process 200 may refer to elements mentioned above in connection with FIG. 1. In practical embodiments, portions of the process 200 may be performed by different elements of the system 100 such as the display module 102, the batch capture processing module 104, the memory module 106 comprising: the source database 108, the reference drawing database 110, the drawing comparison database 112, and the disposition database 114, the drawing normalization module 116, the drawing comparison module 118, a statistical data generator module 120, the report generator module 122, and the processor module 124. Process 200 may have functions, material, and structures that are similar to the embodiments shown in FIG. 1. Therefore common features, functions, and elements may not be redundantly described here. Process 200 is discussed below in conjunction with FIG. 3.

Quite often, it is required of a user (i.e., a maintenance engineer, a mods engineer, freighter conversions engineer, a researcher, a physician, etc.) to compare two different versions of drawings stored for example in the source database 108 (e.g., the REDARS database), and then document the results of their findings for future use. These drawings are often very complex and therefore, it can be very time-consuming to determine the change that has been made. It would often be helpful to capture the conclusion reached by the user once the drawing differences are identified, as that knowledge can save time for future users that need to compare the same two drawings. As mentioned above, sometimes this information is captured by the user, but it can easily be lost or not recorded in a timely manner when the user is focused on solving the immediate task. The process 200 provides a way to make it easier and more efficient for the user to recognize what has changed, and to capture the disposition made by the user as an aid for future users.

Process 200 may begin by accessing the source database 108 (task 202). The source database 108 may be located locally at the system 100 or may accessed remotely, via, for example Internet, and the like. For example, as mentioned above, the REDARS database may be used to compare two different versions of drawings stored therein.

Process 200 may then continue by the batch capture processing module 104 capturing a plurality of pairs of drawing picture frames from the source database 108 and or the reference drawing database 110 (task 204).

Process 200 may then continue by the drawing normalization module 116 normalizing the pairs of drawing picture frames to establish pairs of normalized drawing picture frames (task 206). In this manner, as mentioned above, the pairs of drawing picture frames are automatically pre-processed or normalized. Normalizing the pairs of drawing picture frames automatically identifies potential problems that may be encountered when comparing drawing pictures frames. The drawing normalization module 116 compares each pair of drawing picture frames and re-aligns to adjust them for, for example but without limitation, deviations in rotation, scale factor, mirror images, translations, and the like. If proper alignment cannot be completed, each pair of the drawing picture frames is flagged so that the user can perform a drawing comparison individually for this pair of the drawing picture frames, if desired.

In one embodiment, several picture frames may be combined into one picture before or after performing one or more of these re-alignment transformations, prior to the comparison. The pairs of the normalized drawing picture frames can then be compared as explained in more detail in the context of discussion of FIG. 3 below.

Process 200 may then continue by the drawing comparison module 118 creating additional drawing picture frames for each of the pairs of normalized drawing picture frames respectively (task 208).

Process 200 may then continue by the drawing comparison module 118 comparing each of the respective pairs of normalized drawing picture frames to generate respective drawing comparisons thereof (task 210) as explained in more detail below in the context of discussion of FIG. 3.

Process 200 may then continue by the drawing comparison module 118 displaying each of the drawing comparisons on their respective additional picture frame (task 212).

Process 200 may then continue by the system 100 storing the drawing comparison database 112 (task 214).

Process 200 may then continue by the system 100 storing the disposition database 114 (task 216). As mentioned above, the disposition database 114 may comprise, for example but without limitation, the pairs of the drawing picture frames, the drawing comparisons, a user assessment of the drawing comparisons, notes, links to data sources, and the like. In this manner, results of user's findings can be used for future use.

Process 200 may then continue by the statistical data generator module 120 communicating a statistical report identifying which of the drawing comparisons are recommended and not recommended for review (task 218). An exemplary drawing comparison is presented in FIG. 3 showing a table 300 of exemplary statistical data. The table 300 shows a case 1 and a case 2 comprising statistical data resulting from comparing drawing/image pairs (pairs of normalized drawing picture frames) for each case respectively. In each of the cases, pairs of drawings (i.e., drawing 1 and drawing 2) are compared for each of three portions of a whole drawing generating: comparison 1, comparison 2, and comparison 3, for each pair. In the embodiment shown in FIG. 3, the comparison 1 comprises a comparison between a first sheet of the drawing 1 and a first sheet of the drawing 2, the comparison 2 comprises a comparison between a second sheet of drawing 1 and a second sheet of the drawing 2, and the comparison 3 comprises a comparison between a third sheet of the drawing 1 and a third sheet of the drawing 2.

For example, the first sheet of the drawing 1 and the first sheet of the drawing 2 may comprise a left-most third portion of a whole drawing 1 and a left-most third portion of a whole drawing 2 respectively, the second sheet of the drawing 1 and the second sheet of the drawing 2 may comprise a middle third portion of a whole drawing 1 and a middle third portion of a whole drawing 2 respectively, and the third sheet of the drawing 1 and the third sheet of the drawing 2 may comprise a right-most third portion of a whole drawing 1 and a right-most third portion of a whole drawing 2 respectively. Alternatively, the sheets 1-3 of each of the drawing 1 and the drawing 2 may be combined into one respective drawing and then compared as a whole drawing 1 and a whole drawing 2.

The table 300 shows number of pixels compared (Blk Pixels) 306/312, number of pixels changed (changed pixels) 308/314, and percentage of changed pixels (% changed) 310/316 among the Blk Pixels 306/312. As shown in the table 300, % changed 310 for the comparison 1, comparison 2, and comparison 3 of the case 1 is 11.42%, 1.96%, and 7.27% respectively indicating that the case 1 yielded useful results, therefore the user finds the comparison useful and may recommend the comparison for viewing. In contrast, % changed for the comparison 1, comparison 2, and comparison 3 of the case 2 is 85.65%, 92.16%, and 88.16% respectively indicating that the case 2 did not yield useful results, therefore the user does not find the comparison useful and may not recommend the comparison for viewing.

Process 200 may then continue by the report generator module producing a report (task 220). The report may comprise, for example but without limitation, a drawing comparison (table 300), a disposition, progress, results, and the like.

Process 200 may then continue by the display module 102 displaying the report (task 222). For example, the display module 102 provides for visualization of the drawing differences (table 300) between old engineering designs to their related current revisions, and presents related engineering decisions.

In this way, embodiments save considerable time over the current process to disposition drawing data. Furthermore, embodiments provide more accurate, near real-time status of the disposition process, enabling optimization of the overall effort and therefore better feedback to a customer, as well as better estimates of the cost of the disposition phase. In this manner, embodiments save considerable time over the current process. For example, engineering for freighter conversions are estimated to save 50% of the time currently spent to disposition data. Furthermore, embodiments provide more accurate real-time status of the disposition process, enabling optimization of the overall effort and therefore better feedback to a customer such as an airline customer, as well as better estimates of a cost of the disposition process.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 124 to cause the system 100 to perform specified operations, such as for example but without limitation, causing the drawing comparison module 118 to automatically produce comparisons for a large number of pairs of drawing picture frames. Such instructions, generally referred to as "computer-executable instructions", "computer program code", or "program code" (which may be grouped in the form of computer programs or other groupings), when executed, enable the drawing comparison method of the system 100.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIG. 1 depicts example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An automated drawing comparison system comprising:
   a batch capture processing module operable to capture a plurality of pairs of drawing picture frames, the drawing picture frames comprising engineering and tooling drawings;
   a drawing normalization module operable to normalize the pairs of drawing picture frames of the plurality to establish pairs of normalized drawing picture frames;
   a drawing comparison module operable to compare the engineering and tooling drawings of each drawing picture frame of each of the respective pairs to generate respective drawing comparisons thereof; and
   a statistical data generator module operable to communicate a statistical report identifying which of the respective drawing comparisons are recommended and not recommended for review based on a percentage of changed pixels between the engineering and tooling drawings.

2. The system according to claim 1, further comprising a memory module operable to store a source database, a reference drawing database, a disposition database, and a drawing comparison database.

3. The system according to claim 1, further comprising a display module operable to display the statistical report.

4. The system according to claim 3, further comprising a user interface presented on the display module allowing a user to record a disposition of each of the drawing comparisons.

5. The system according to claim 1, wherein the drawing comparison module is further operable to create additional drawing picture frames for each of the pairs of normalized drawing picture frames respectively.

6. The system according to claim 5, wherein the drawing comparison module is further operable to display each of the drawing comparisons on their respective additional picture frame.

7. The system according to claim 1, further comprising a report generator module operable to produce a report comprising, a drawing comparison, a disposition, progress, and results.

8. A method of automatic drawing comparison, the method comprising:
   capturing a batch of a plurality of pairs of drawing picture frames, the drawing picture frames comprising engineering and tooling drawings;
   normalizing the pairs of drawing picture frames of the plurality to establish respective pairs of normalized drawing picture frames;
   comparing the engineering and tooling drawings of each of the respective pairs of normalized drawing picture frames to generate respective drawing comparisons thereof; and
   communicating a statistical report identifying which of the drawing comparisons are recommended and not recommended for review based on a percentage of changed pixels between the engineering and tooling drawings.

9. The method of claim 8, further comprising storing a source database, a reference drawing database, a drawing comparison database, and a disposition database.

10. The method of claim 8, further comprising reporting a drawing comparison, a disposition, progress, and results.

11. The method according to claim 8, further comprising presenting a user interface on a display allowing a user to record a disposition of each of the drawing comparisons.

12. The method according to claim 8, further comprising:
creating additional drawing picture frames for each of the pairs of normalized drawing picture frames respectively; and
displaying each of the drawing comparisons on their respective additional picture frame.

13. A non-transitory computer readable storage medium comprising computer-executable instructions for performing a method for an automatic drawing comparison, the method executed by the computer-executable instructions comprising:
capturing a batch of a plurality of pairs of drawing picture frames, the drawing picture frames comprising engineering and tooling drawings;
normalizing the pairs of drawing picture frames of the plurality to establish respective pairs of normalized drawing picture frames; comparing the engineering and tooling drawings of each of the respective pairs
of normalized drawing picture frames to generate respective drawing comparisons thereof; and
communicating a statistical report identifying which of the drawing comparisons are recommended and not recommended for review based on a percentage of changed pixels between the engineering and tooling drawings.

14. The non-transitory computer readable storage medium of claim 13, further comprising computer-executable instructions comprising storing a source database, a reference drawing database, a drawing comparison database, and a disposition database.

15. The non-transitory computer readable storage medium of claim 13, further comprising computer-executable instructions comprising displaying the statistical report.

16. The non-transitory computer readable storage medium according to claim 13, further comprising computer-executable instructions comprising presenting a user interface on a display allowing a user to record a disposition of each of the drawing comparisons.

17. The non-transitory computer readable storage medium according to claim 13, further comprising computer-executable instructions comprising creating additional drawing picture frames for each of the pairs of normalized drawing picture frames respectively.

18. The non-transitory computer readable storage medium according to claim 17, further comprising computer-executable instructions comprising displaying each of the drawing comparisons on their respective additional picture frame.

19. The non-transitory computer readable storage medium according to claim 18, further comprising computer-executable instructions comprising reporting a drawing comparison, a disposition, progress, and results.

20. The non-transitory computer readable storage medium according to claim 19, wherein the drawing comparison comprises comparison between portions of each of the pairs of normalized drawing picture frames.

\* \* \* \* \*